(12) United States Patent
Andonian

(10) Patent No.: US 9,203,269 B2
(45) Date of Patent: Dec. 1, 2015

(54) CONSTRUCTING AN ELECTRIC MACHINE

(75) Inventor: Archie A. T. Andonian, Huntington Beach, CA (US)

(73) Assignee: Calnetix Technologies, LLC, Cerritos, CA (US)

( * ) Notice: Subject to any disclaimer, the term of this patent is extended or adjusted under 35 U.S.C. 154(b) by 238 days.

(21) Appl. No.: 13/601,853

(22) Filed: Aug. 31, 2012

(65) Prior Publication Data

US 2014/0062253 A1 Mar. 6, 2014

(51) Int. Cl.
| | |
|---|---|
| *H02K 1/06* | (2006.01) |
| *H02K 1/04* | (2006.01) |
| *H02K 1/12* | (2006.01) |
| *H02K 15/02* | (2006.01) |

(52) U.S. Cl.
CPC .. *H02K 1/04* (2013.01); *H02K 1/12* (2013.01); *H02K 15/02* (2013.01); *Y10T 29/49009* (2015.01)

(58) Field of Classification Search
USPC ........ 310/216.065, 43, 45, 216.001–216.008, 310/254.1
See application file for complete search history.

(56) References Cited

U.S. PATENT DOCUMENTS

| | | | | |
|---|---|---|---|---|
| 4,085,347 | A * | 4/1978 | Lichius | 310/216.065 |
| 4,275,319 | A * | 6/1981 | Davis, Jr. | 310/43 |
| 4,712,027 | A * | 12/1987 | Karidis | 310/12.24 |
| 6,777,835 | B1 * | 8/2004 | Sines | 310/64 |
| 7,536,779 | B2 * | 5/2009 | Hara et al. | 29/606 |
| 2005/0005990 | A1 * | 1/2005 | Williams et al. | 138/150 |
| 2005/0006974 | A1 * | 1/2005 | Dalrymple et al. | 310/215 |
| 2005/0110354 | A1 * | 5/2005 | Datta | 310/88 |
| 2008/0022511 | A1 * | 1/2008 | Hara et al. | 29/604 |
| 2009/0091202 | A1 * | 4/2009 | Parmeter et al. | 310/87 |
| 2009/0256442 | A1 * | 10/2009 | Stiesdal | 310/90 |
| 2010/0264780 | A1 * | 10/2010 | Kiefer et al. | 310/340 |
| 2012/0063933 | A1 * | 3/2012 | Rumbaugh et al. | 417/410.1 |

\* cited by examiner

*Primary Examiner* — Thanh Lam
(74) *Attorney, Agent, or Firm* — Fish & Richardson P.C.

(57) ABSTRACT

The present specification describes systems, methods, and apparatuses for bonding core laminations for electric machines (e.g., stators, actuators, sensors, etc.) using fluoropolymer films. A first metallic lamination can be aligned together with a second metallic lamination with a fluoropolymer in-between. The first and the second metallic laminations can be bonded together with the fluoropolymer. The first and second metallic laminations can be aligned with the fluoropolymer in-between below the melting temperature of the fluoropolymer. The first metallic stator lamination can be clamped to the second metallic stator lamination to fix the relative position. Thereafter, the temperature of the fluoropolymer can be increased above the melting temperature for bonding the first and the second metallic stator laminations.

10 Claims, 4 Drawing Sheets

CONSTRUCTING AN ELECTRIC MACHINE

TECHNICAL FIELD

The present disclosure pertains to electric machines.

BACKGROUND

Some electric machine systems operate under difficult conditions, such as exposure to corrosive chemicals at high temperatures. In some instances, electric machines can be used in a Rankine cycle, where components of the electric machines are in direct contact with the working fluid. For example, in the Rankine cycle, a working fluid can absorb heat from a heat source to become gaseous. The gaseous working fluid can be used to propel a prime mover, such as a turbine rotor, to move relative to a stator for generating electricity. Both the rotor and the stator can become submerged in the gaseous working fluid. The working fluid can include corrosive chemicals, such as toluene, that can dissolve adhesives used for bonding components in electric machines. For instance, the stator core of an electric machine is commonly manufactured with thin layers of metallic or other magnetically conductive materials that are bonded together using adhesives. The adhesives can be etched away or dissolved when exposed to the working fluid (especially when the working fluid is at high temperatures (e.g., 200 degrees Celsius)), thereby compromising the stator core.

SUMMARY

The present specification describes a method for bonding core laminations in electric machines (e.g. stators, actuators, sensors etc.) using fluoropolymer films to construct the component core. In a general aspect, the method includes positioning a first metallic stator lamination together with a second metallic stator lamination with a fluoropolymer in-between. The first and the second metallic stator laminations can be bonded together with the fluoropolymer. In some specific aspects, positioning the first metallic stator lamination together with the second metallic stator lamination with the fluoropolymer in-between can be performed below the melting temperature of the fluoropolymer. After the positioning is completed, the first metallic stator lamination can be clamped to the second metallic stator lamination to fix the relative position. Thereafter, the temperature of the fluoropolymer can be increased above the melting temperature for bonding the first and the second metallic stator laminations. The method can be used to bond more than two laminations of the stator core by placing fluoropolymer film between each and every layer of metallic lamination, aligning the layers to form the stator core, clamping the laminations to maintain the component geometry and heating the clamped stator core above the melting temperature of the fluoropolymer film to bond the metallic laminations. The methodology can be used to bond laminations in other electric machine components such as actuators, sensors etc.

Certain aspects of the present disclosure are directed to a method of constructing a laminated core for an electric machine. A first metallic lamination can be positioned together with a second metallic lamination with a fluoropolymer in-between. The first and second metallic laminations can be bonded together with the fluoropolymer.

Certain aspects of the present disclosure are directed to stator core for a stator of an electric machine. The stator core may include a first metallic stator lamination and a second metallic stator lamination bonded to the first metallic stator lamination by a fluoropolymer in-between.

Certain aspects of the present disclosure are directed to an electric machine that includes a stator having a core configured to receive a rotor of the electric machine. The core can include a first metallic stator lamination and a second metallic stator lamination bonded to the first metallic stator lamination by a fluoropolymer in-between.

In certain aspects of the implementations, positioning a first metallic lamination together with a second metallic lamination with a fluoropolymer in-between can be performed below the melting temperature of the fluoropolymer. Bonding the first and second metallic laminations with the fluoropolymer may include heating the fluoropolymer above a melting temperature of the fluoropolymer. After positioning a first metallic lamination together with a second metallic lamination with a fluoropolymer in-between, the first metallic stator lamination can be clamped to the second metallic lamination.

In certain aspects of the implementations, positioning a first metallic lamination together with a second metallic lamination with a fluoropolymer in-between may include positioning a fluoropolymer film that is separate from the first and second metallic laminations in-between the first and second metallic laminations.

Certain aspects of the implementations can include bonding the fluoropolymer to a surface of a metallic sheet material and forming the first metallic lamination from the sheet material.

Certain aspects of the implementations can include forming the first metallic lamination from a metallic sheet material having a fluoropolymer bonded to a surface of the sheet material.

Certain aspects of the implementations can include positioning a third metallic lamination together with the first and second metallic stator laminations with a fluoropolymer in-between the third metallic lamination and the second metallic lamination. The third metallic stator lamination can be bonded to the second metallic lamination with the fluoropolymer in-between the third metallic lamination and the second metallic lamination.

In certain aspects of the implementations, bonding the first and second metallic laminations together with the fluoropolymer and bonding the third metallic lamination to the second metallic lamination with the fluoropolymer in-between the third metallic lamination and the second metallic lamination can be performed concurrently.

In certain aspects of the implementations, the fluoropolymer may include one or more of fluorinated ethylene propylene (FEP), perfluoroalkoxy (PFA), or polytetrafluoroethylene (PTFE).

In certain aspects of the implementations, the first lamination is generally annular and defines a plurality of windings slots extending radially outward from an inner diameter of the lamination.

In certain aspects of the implementations, the laminated core is one of a stator core, an actuator, or a sensor.

DESCRIPTION OF DRAWINGS

Like reference symbols in the various drawings indicate like elements.

DETAILED DESCRIPTION

Figure 1:
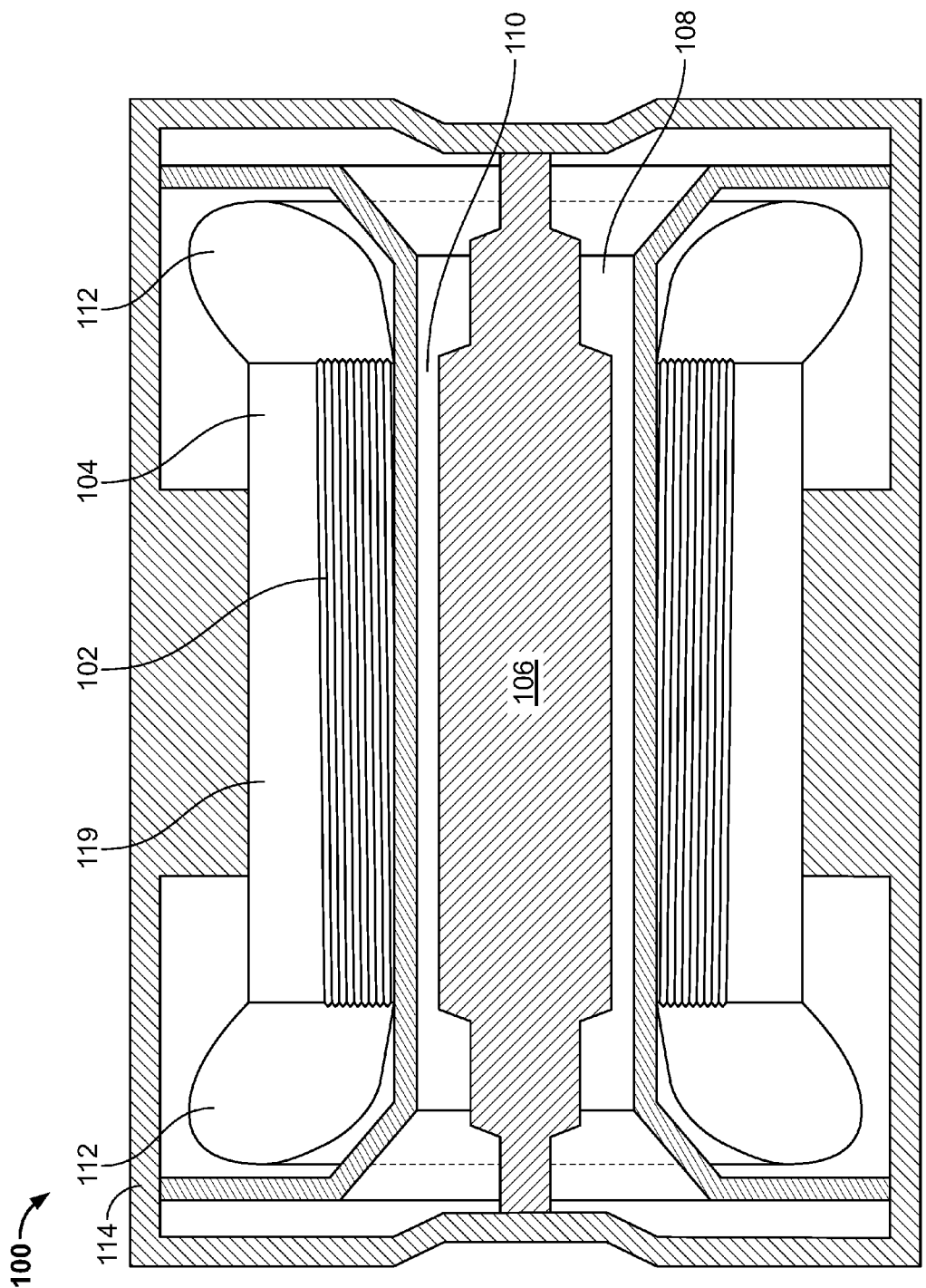
FIG. 1 is a cross-sectional view of an example electric machine.

Electric machines can operate to convert mechanical movement into electrical power, convert electrical power into mechanical movement, or both. Electric machines usually include a moving component and a static component for electromagnetic interaction. For example, actuating the moving component made of conductive materials in a magnetic field of the static component can generate electrical current, or supplying electrical power to the static component can actuate the moving component. In general, the static component can be referred to as a stator, which can include windings of conductive wires for generating magnetic field or electricity, depending on the role of the electric machine. The windings are usually wound around a stator core, formed from many layers of laminations or laminates (the two terms are interchangeable in this specification). In some applications, electric machines are exposed to corrosive chemicals at high temperatures, for example, in a Rankine cycle where working fluid propels the moving component to move relative to the stator. The stator can be completely submerged in the working fluid that contains corrosive chemicals such as high-temperature toluene (e.g., 200 degrees Celsius).

The laminations may include thin, metallic layers and may be bonded using adhesive to form the stator core. Typical bonding adhesives can be deteriorated by certain chemicals. Additionally, the bonding process can result in high clean-up costs. The present specification describes methods and systems for bonding the laminations using fluoropolymer films. Fluoropolymer films provide resistance against deterioration as well as manufacturing efficiency (i.e., reducing messiness during manufacturing, such as avoiding adhesive clean-up time and adhesive manipulation time, among others). First, the fluoropolymer film can provide a bond between the metallic laminations at the same level of mechanical requirements as general adhesive bonds. The thickness of the fluoropolymer film can be reduced below an unloaded thickness by increasing stacking pressure during the bonding process, which can also increase the number of laminations for a given stator core dimension. The fluoropolymer film can provide substantial resistance to chemicals that include oxygenated fuels (e.g., toluene) and extreme temperatures (e.g., over ±200 degrees Celsius). In addition, the fluoropolymer film can have very low thermal expansion coefficients (e.g., 90E-10) and low dielectric constant (e.g., 2.1). In some implementations, the fluoropolymer film can be fluorinated ethylene propylene (FEP), perfluoroalkoxy (PFA), or polytetrafluoroethylene (PTFE). Other fluoropolymers are also contemplated.

The present disclosure further describes a method for bonding electric machine core laminations (e.g. laminations for stators, actuators, sensors, etc.) using fluoropolymer films to construct the component core. In a general aspect, to assemble a stator core, the method includes positioning multiple metallic stator laminations together with a fluoropolymer in-between. For example, a first metallic stator lamination is positioned together with a second metallic stator lamination with a fluoropolymer in-between. The first and the second metallic stator laminations can be bonded together with the fluoropolymer, which is magnetically permeable. In some specific aspects, positioning the first metallic stator lamination together with the second metallic stator lamination with the fluoropolymer in-between can be performed below the melting temperature of the fluoropolymer. After the positioning is completed, the first metallic stator lamination can be clamped to the second metallic stator lamination to fix the relative position. Thereafter, the temperature of the fluoropolymer can be increased above the melting temperature. A strong bond can be produced between the first and the second metallic stator laminations when the temperature is reduced to room temperature. The bond integrity between laminations can be maintained as long as the fluoropolymer film is kept below the melting temperature.

In some implementations, the fluoropolymer can be bonded to a surface of a metallic sheet material. The sheet material bonded with the fluoropolymer can then be used to form the first metallic stator lamination. Multiple, in certain instances, tens, hundreds or more metallic stator laminations can be stacked to a predetermined dimension of the stator core. For example, a third metallic stator lamination can be positioned together with the first and second metallic stator laminations with a fluoropolymer between the third metallic stator lamination and the second metallic stator lamination. The third metallic stator lamination can be bonded to the second metallic stator lamination with the fluoropolymer between the third metallic stator lamination and the second metallic stator lamination. Although the bonding between the first and the second metallic stator laminations, and the bonding between the second and the third metallic stator laminations are described in sequence for clarity, it should be understood that the bonding process of the three or more laminations can be conducted concurrently. Each lamination may include a profile that is generally annular and defines a number of winding slots extending radially outward from an inner diameter of the lamination. Details of the construction method as well as the stator core are described as follows.

FIG. 1 is a cross-sectional view of an example electric machine 100. The electric machine 100 can operate as a generator (e.g., a turbine generator in a Rankine cycle), producing electrical power from mechanical movement, operate as a motor producing mechanical movement from electricity, or alternate between generating electrical power and motoring. In general, the electric machine 100 includes at least a stationary member (e.g., stator 119) and a movable member (e.g., rotor 106) that, by electromagnetic interaction, generates electrical power as the movable member (e.g., connected to a turbine propelled by working fluid) moves relative to the stationary member. As described in more detail below, the electric machine 100 is an alternating current (AC), synchronous, permanent magnet (PM) electric machine having a rotor 106 that includes permanent magnets and a stator 119 that includes a plurality of formed or cable windings about a core 104. The permanent magnets can be held to the rotor 106 with a composite (e.g., fiber and polymer) sleeve or other non-magnetic metal sleeve. The electric machine may have the rotor 106 supported by conventional and/or magnetic bearings. In other instances, the electric machine 100 can be another type of electric machine, such as an AC, asynchronous, induction machine where both the rotor and the stator include windings.

As illustrated in FIG. 1, the electric machine 100 includes a housing 114 defining an interior 108. The rotor 106 is rotatable relative to the stator 119 and disposed in the interior 108 thereof. There is a gap 110 between the stator 119 and the rotor 106. The example stator 119 includes an electromagnetic winding 102 mounted on a cylindrical stator core 104. Some implementations of the winding 102 can be configured for the electric machine to function as a synchronous, AC electric machine. Some implementations of the winding 102 can include two-pole windings, forming a three-phase electromagnet. Other implementations are possible as well, depending on the electric machine application, including four-pole windings, single-phase windings, and other winding configurations.

The winding 102 can be constructed by winding cable or formed conductors through stator core slots to form the winding loops or coils. The stator core 104 can be constructed of metallic, laminated plates, bonded together to form the core structure. The materials used in stator core 104 plates can be selected so as to adjust the electromagnetic flux characteristics of the winding 102 wound around the core slots. The core material can be selected also by considering the material used in the cable of the winding, so as to achieve a desired electromagnetic stator profile. For example, copper-based, insulated cables can be used for the winding 102. The cable can be wound around a core 104 built of steel plates laminated together with a silicon-based, low-loss laminate. It is contemplated that the slots of the stator core 104, as described in more detail below, can be implemented using a variety of slot shapes and sizes. The selection of the slot geometry can be based on the cable type (or types) used in the windings. Additionally, the winding 102 can be constructed as form-wound or random-wound coils. In certain instances, the windings 102 result in winding end turns 112 positioned on the axial ends of the stator core 104. Various end turn winding techniques can be used to provide for end turns 112 with the particular structural and electromagnetic characteristics desired for a certain particular stator design.

Figure 2:
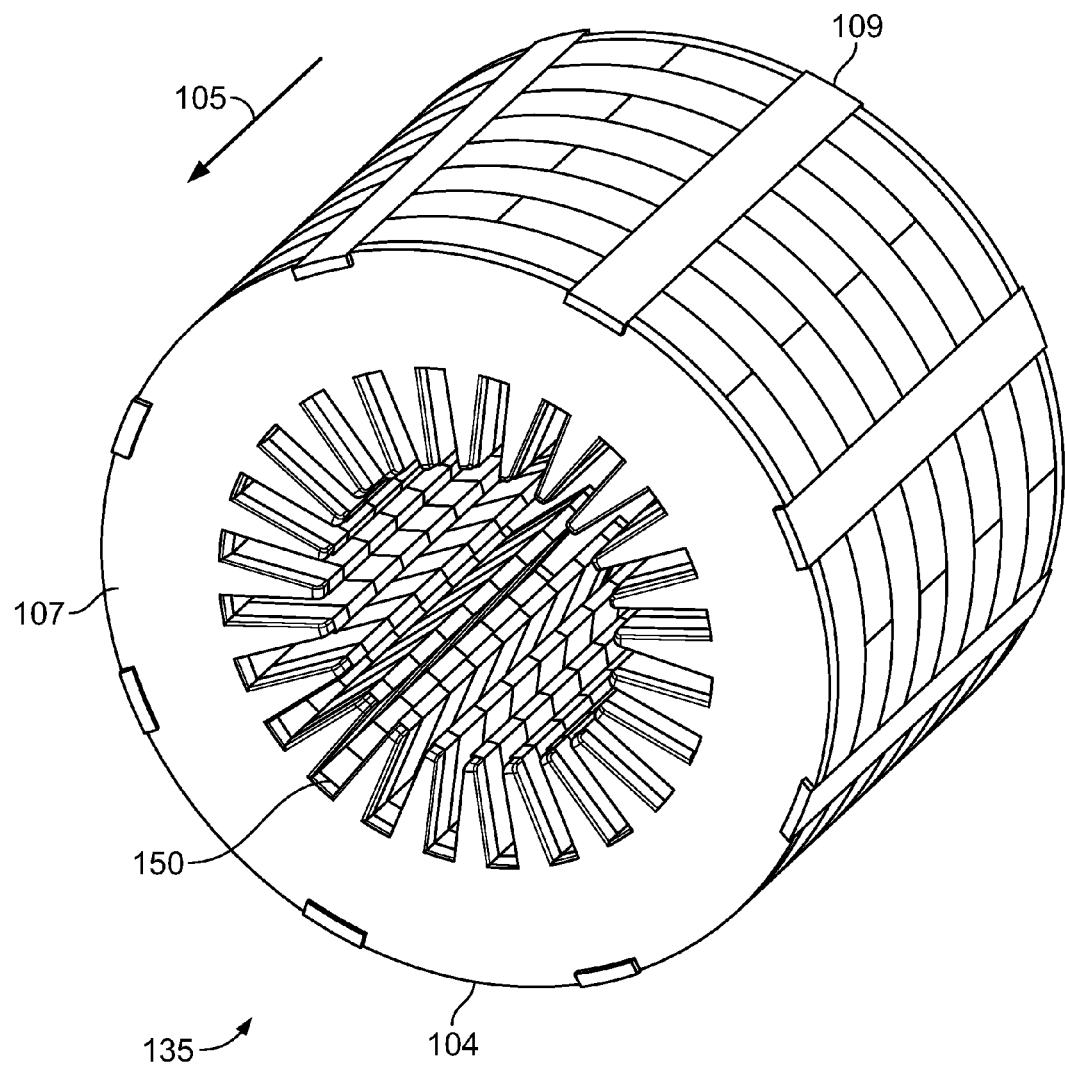
FIG. 2 is a perspective view of an example stator core for use in an electric machine.

The stator, such as the stator 119 shown in FIG. 1, may be formed from a stator core 104 and windings 102 extending through the stator core 104. An example stator core 104 is shown in FIG. 2. FIG. 2 is a perspective view 135 of the stator core 104 for use in the electric machine 100. The stator core 104 can be formed from a plurality of laminations 107 assembled in a longitudinal direction 105 and bounded by lamination end plates. The stator core 104 can include deep channels 150 for securing the winding 102. In the example implementations, the laminations 107 of the stator core 104 are bonded using fluoropolymer that provides support maintaining lamination integrity. Details of the bonding of the laminations 107 and the fluoropolymer are discussed below. In some implementations, a retraining structure 109 can be used to support the stator core 104.

Figure 3:
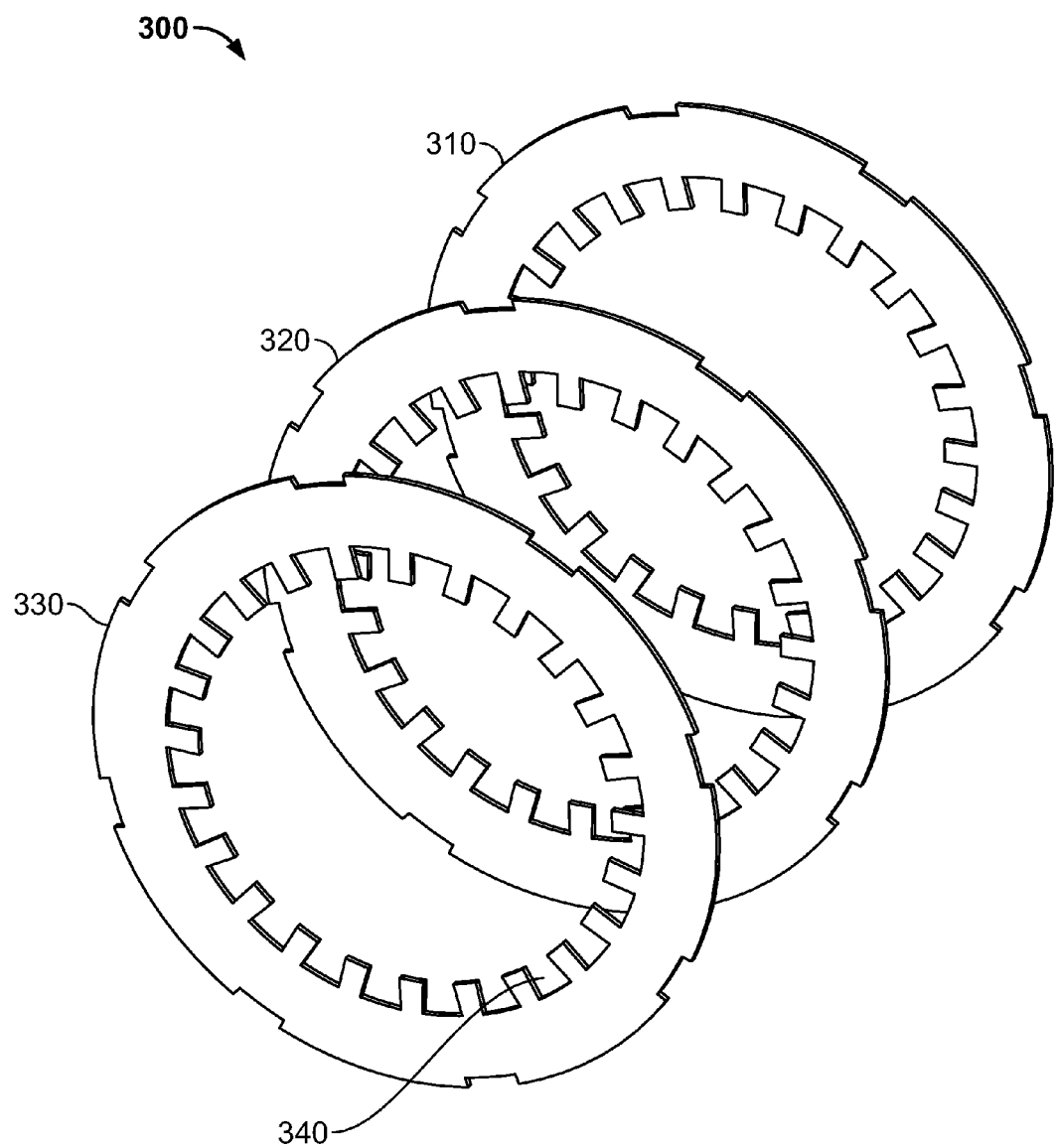
FIG. 3 is an exploded view of components of the example stator core of FIG. 2.

FIG. 3 is an explosive view 300 of components of the example stator core 104 of FIG. 2. The components illustrated in FIG. 3 include a first metallic stator lamination 310, a fluoropolymer 320, and a second metallic stator lamination 330. These components can be stacked repetitively to form a stator core of a given length: for example, a third metallic stator lamination (not shown) can be bonded to the second metallic stator lamination 330 using a fluoropolymer between the second and third metallic stator laminations. A fourth, fifth and more metallic stator laminations and fluoropolymer layers can be sandwiched together in a way that every fluoropolymer layer is placed between metallic stator laminations and every metallic stator lamination is bonded with fluoropolymer layers. In certain instances, the fluoropolymer 320 can provide all the support maintaining the first 310 and second metallic stator laminations 330 together. In other instances, additional structure (e.g., straps) can be used to provide additional integrity support. The fluoropolymer 320 can employ various materials, for example, the fluoropolymer 320 can include ethylene propylene (FEP), perfluoroalkoxy (PFA), polytetrafluoroethylene (PTFE), among others. These materials enable the bonding layer to be corrosion-resistant against chemicals such as toluene, among other corrosive substances, at high temperatures (e.g., above 200 degrees Celsius).

As illustrated in FIG. 3, the stator core 104 of FIG. 2 can have a profile where the metallic stator laminations are generally annular and define a plurality of windings slots 340 extending radially outward from an inner diameter of the lamination. Although the metallic stator laminations 310 and 330 are illustrated at a thickness comparable to the thickness of the fluoropolymer 320, it should be understood that the illustration in FIG. 3 does not reflect actual scale. For example, the fluoropolymer 320 may have an actual thickness of 0.5 mil (i.e., about 0.013 mm), versus the stator laminations 310 and 330 that can be much thicker. In addition, the thickness of the fluoropolymer 320 may vary substantially before and after the bonding process. During the bonding process, a clamping force is applied to compress the metallic stator laminations 310 and 330 together with the liquefied fluoropolymer 320 (above its melt temperature). Above its melt temperature, the liquid fluoropolymer 320 may result in different thicknesses depending on the clamping force. For example, the greater the clamping force, the thinner the fluoropolymer 320 may set. The control over the thickness of the fluoropolymer 320 can be advantageous for at least three reasons: the overall length of the stator core can be controlled at a desired variation; the lamination density (e.g., in terms of laminations per unit length) can be controlled; and the laminations thinness can be controlled for given stator core length to reduce eddy current formation.

For example, a number of metallic stator laminations (e.g., the laminations 310 and 330) can be positioned (e.g., aligned) together with a fluoropolymer (e.g., the fluoropolymer 320) between every metallic stator lamination. The positioning process can include positioning tools designed to hold and place each metallic stator lamination to a stacking column such that the edges of the metallic stator laminations can be controlled within certain variance. Each metallic stator lamination and each layer of fluoropolymer can be placed in sequence to form a stack of laminations. the stack of laminations can be clamped by applying compression to the ends. For example, a clamping device can hold the stack of laminations in position while moving one end of the stack towards the other end. The movement can be achieved using various mechanisms (e.g., hydraulic, pneumatic, screws, etc.). A control mechanism may monitor the compression force applied to the stack of laminations. The compression force can be directly related to the final thickness of the bonded and cured fluoropolymer. For example, the greater the compression forces, the thinner the bonded and cured fluoropolymer. The stack of clamped laminations is heated above the melting temperature of the fluoropolymer. This heating process melts the fluoropolymer layer, altering its shape so that the gap between the fluoropolymer layer and the metallic stator lamination layer can be eliminated. For example, the fluoropolymer can be fluorinated ethylene propylene, which has a melting point of 260 degrees Celsius; perfluoroalkoxy, which has a melting point of 305 degrees Celsius; or polytetrafluoroethylene, which has a melting point of 327 degrees Celsius; or other fluoropolymer. The heated fluoropolymer can be fluidic or compliant so that it molds to the surface profile of the metallic stator lamination layers. The temperature of the stack of laminations is then lowered to set the fluoropolymer. The fluoropolymer becomes solidified, bonding the surfaces of the metallic stator laminations together.

In some implementations, the fluoropolymer 320 can be bonded to any of the metallic stator laminations prior to positioning and bonding. For example, the fluoropolymer 320 can be bonded to one side of the metallic stator lamination 310 prior to positioning. Or the material forming the fluoropolymer 320 can first be bonded to one side of the material forming the metallic stator lamination 310. The bonded materials can be made (e.g., using die cut, EDM, water jet, etc.) into the profile of the illustrated metallic stator lamination 310. In some implementations, the lamination material pre-coated/pre-bonded with the fluoropolymer may be commercially available and purchased off the shelf. This pre-bonded configuration can reduce the step of positioning the fluoropolymer 320 in-between the two metallic stator laminations 310 and 330. The bonded materials of the fluoropolymer 320 and the lamination 310 can then be clamped with the metallic stator lamination 330 and go through a heat-cycle bonding process as described above.

Figure 4:
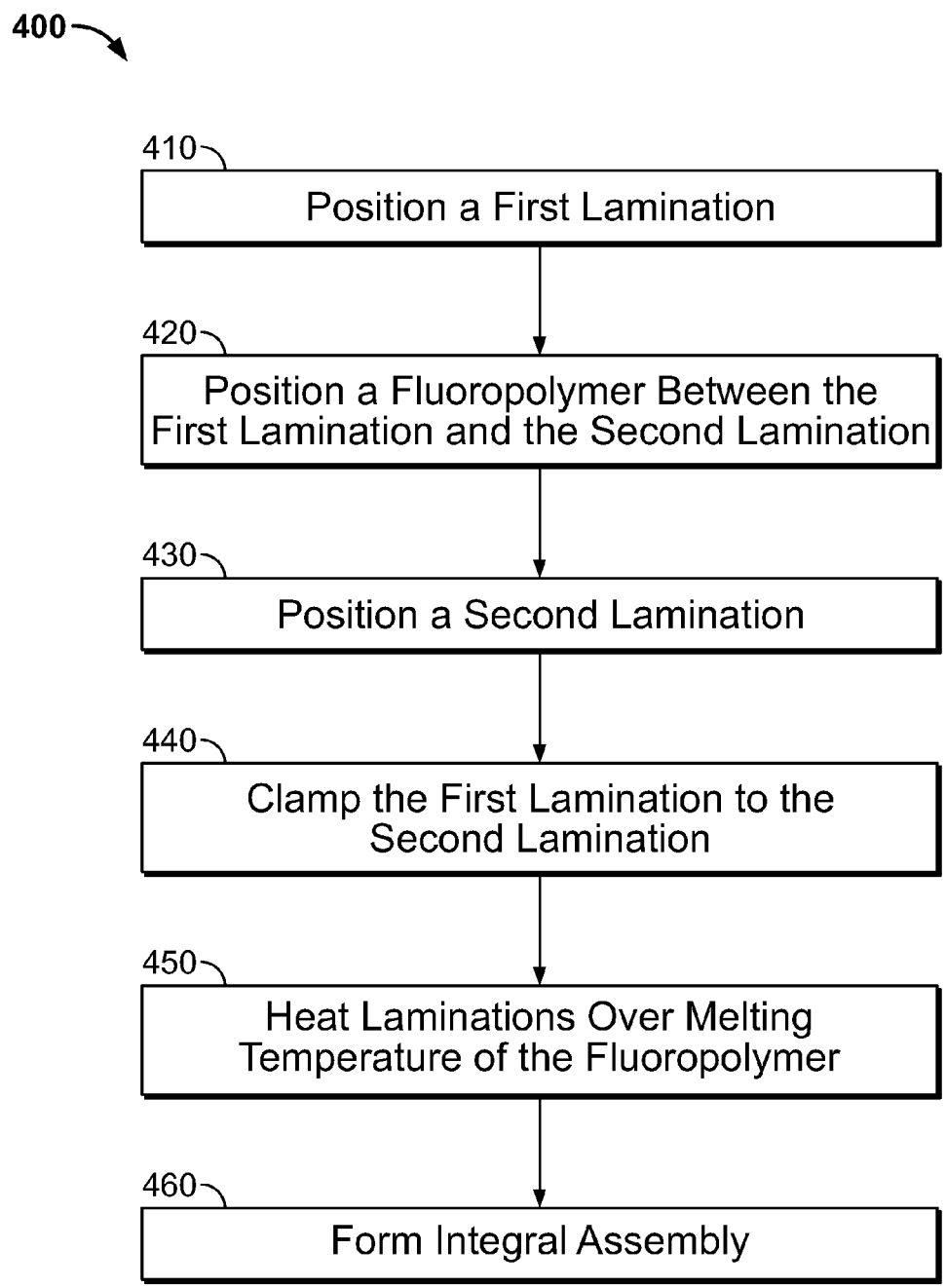
FIG. 4 is an example method for constructing an electric machine.

FIG. 4 is an example method 400 for constructing an electric machine. The example method 400 can be used to form the stator core 104 of FIGS. 1 and 2. At 410, a first lamination is positioned. The first lamination can be similar to the metallic stator lamination 310 shown in FIG. 3. At 420, a fluoropolymer is placed between the first lamination and the second lamination. For example, the fluoropolymer may be a layer of film inserted between the first and the second laminations. Other methods may be used, for example, the fluoropolymer may be sprayed onto the first lamination in a liquid form (e.g., in a form of liquid resin or melted liquid, etc.). In some implementations, the fluoropolymer may be pre-bonded to one of the surfaces of the laminations. For example, the first lamination can be manufactured with the fluoropolymer bonded to one side. At 430, a second lamination is positioned to the fluoropolymer. The second lamination can be embodied as the metallic stator lamination 330 shown in FIG. 3. The first and the second laminations can be placed in a stack container or device that can align the edges of the two laminations within a designed variance.

More laminations can be stacked to the first and the second laminations. At 440, the first lamination is clamped to the second lamination by applying compression to the ends. For example, a clamping device can hold the two laminations in position while moving one of the laminations towards the other. The movement can be achieved using various mechanisms (e.g., hydraulic, pneumatic, screws, etc.). A control mechanism may monitor the compression force applied to the clamped laminations. The compression force can be directly related to the final thickness of the bonded and/or cured fluoropolymer. For example, the greater the compression force, the thinner the bonded and/or cured fluoropolymer. At 450, the clamped laminations are heated over the melting temperature of the fluoropolymer. For example, the fluoropolymer layer is melted to fill the gap between the laminations to bond the laminations together. The fluoropolymer can be fluorinated ethylene propylene, which has a melting point of 260 degrees Celsius; or can be perfluoroalkoxy, which has a melting point of 305 degrees Celsius; or can be polytetrafluoroethylene, which has a melting point of 327 degrees Celsius. The melted fluoropolymer can be fluidic or very compliant to fit with the surface profile of the laminations to achieve a strong adhesion after it has cooled down or cured. At 460, the clamped and heated laminations are cooled down to normal operation temperature (e.g., room temperature) to form an integral assembly. The integral assembly can be used as a stator core in an electric machine such as the electric machine 100 illustrated in FIG. 1.

A number of implementations have been described. Nevertheless, it will be understood that various modifications may be made. Accordingly, other implementations are within the scope of the following claims.

What is claimed is:

1. A stator core for a stator of an electric machine, comprising:
   a first metallic stator lamination; and
   a second metallic stator lamination bonded to the first metallic stator lamination by a fluoropolymer in-between.

2. The stator core of claim 1, further comprising a third metallic stator lamination bonded to the second metallic stator lamination by the fluoropolymer in-between the second and third metallic stator laminations.

3. The stator core of claim 1, where the fluoropolymer provides substantially all the support maintaining the first and second metallic stator laminations together.

4. The stator core of claim 1, where the fluoropolymer comprises applying one or more of fluorinated ethylene propylene (FEP), perfluoroalkoxy (PFA), or polytetrafluoroethylene (PTFE).

5. The stator core of claim 1, where the first metallic stator lamination is generally annular and defines a plurality of windings slots extending radially outward from an inner diameter of the lamination.

6. An electric machine comprising:
   a stator comprising an core configured to receive a rotor of the electric machine; and
   the core comprising a first metallic stator lamination and a second metallic stator lamination bonded to the first metallic stator lamination by a fluoropolymer in-between.

7. The electric machine of claim 6, further comprising a third metallic stator lamination bonded to the second metallic stator lamination by the fluoropolymer in-between the second and third metallic stator laminations.

8. The electric machine of claim 6, where the fluoropolymer provides substantially all the support maintaining the first and second metallic stator laminations together.

9. The electric machine of claim 6, where the fluoropolymer comprises applying one or more of fluorinated ethylene propylene (FEP), perfluoroalkoxy (PFA), or polytetrafluoroethylene (PTFE).

10. The electric machine of claim 6, where the first metallic stator lamination is generally annular and defines a plurality of windings slots extending radially outward from an inner diameter of the lamination.

* * * * *